United States Patent
Xu et al.

(10) Patent No.: US 11,237,404 B2
(45) Date of Patent: Feb. 1, 2022

(54) STRUCTURED LIGHT PROJECTION MODULE FOR PROJECTING UNRELATED PATTERNS

(71) Applicant: ORBBEC INC., Guangdong (CN)

(72) Inventors: Xing Xu, Guangdong (CN); Zhaomin Wang, Guangdong (CN); Yuanhao Huang, Guangdong (CN); Xu Chen, Guangdong (CN)

(73) Assignee: Orbbec Inc., Shenzhen (CN)

( * ) Notice: Subject to any disclaimer, the term of this patent is extended or adjusted under 35 U.S.C. 154(b) by 8 days.

(21) Appl. No.: 16/822,202

(22) Filed: Mar. 18, 2020

(65) Prior Publication Data
US 2020/0218080 A1 Jul. 9, 2020

Related U.S. Application Data

(63) Continuation of application No. PCT/CN2018/071989, filed on Jan. 9, 2018.

(30) Foreign Application Priority Data

Sep. 19, 2017 (CN) .......................... 201710848344.1

(51) Int. Cl.
*G02B 27/42* (2006.01)
*G01B 11/25* (2006.01)

(52) U.S. Cl.
CPC ............ *G02B 27/425* (2013.01); *G01B 11/25* (2013.01)

(58) Field of Classification Search
CPC .. G02B 27/425; G02B 19/0057; G02B 27/48; G02B 27/0961; G01B 11/25; G01B 11/2513; G01B 11/002
(Continued)

(56) References Cited

U.S. PATENT DOCUMENTS 8,749,796 B2 6/2014 Pesach et al.
9,521,399 B1 12/2016 Hazeghi et al.
(Continued)

FOREIGN PATENT DOCUMENTS

CN 103309137 A 9/2013
CN 104272170 A 1/2015
(Continued)

OTHER PUBLICATIONS

PCT International Preliminary Report on Patentability dated Apr. 2, 2020, issued in related International Application No. PCT/CN2018/071989, with partial English translation (10 pages).
(Continued)

*Primary Examiner* — Isiaka O Akanbi
(74) *Attorney, Agent, or Firm* — Sheppard Mullin Richter & Hampton LLP

(57) ABSTRACT

A diffractive optical element is configured to receive a first patterned light beams, and diffracts the first patterned light beams to project a second patterned light beam outwardly. The second patterned light beam is formed of combined arrangement of a plurality of first patterned light beams, and the combined arrangement includes periodic arrangement in a first direction and a second direction. The first direction and the second direction are not perpendicular to each other. By designing the performance of the diffractive optical element, the outwardly projected structured light pattern is periodically arranged in two directions, and the two directions are not perpendicular to each other, such that spot patterns are highly unrelated in multiple directions, improving accuracy.

17 Claims, 4 Drawing Sheets

(58) Field of Classification Search
USPC .......................................... 356/601–610, 619
See application file for complete search history.

(56) References Cited

U.S. PATENT DOCUMENTS

| | | | |
|---|---|---|---|
| 9,562,760 B2 | 2/2017 | Braker et al. | |
| 2008/0310024 A1 | 12/2008 | Sato et al. | |
| 2012/0051588 A1* | 3/2012 | McEldowney | G03B 21/14 382/103 |
| 2012/0262553 A1* | 10/2012 | Chen | H04N 13/111 348/47 |
| 2013/0038881 A1* | 2/2013 | Pesach | G01B 11/2513 356/610 |
| 2015/0253123 A1* | 9/2015 | Braker | G01B 11/2531 356/610 |
| 2015/0316368 A1 | 11/2015 | Moench et al. | |
| 2015/0355470 A1* | 12/2015 | Herschbach | F21V 5/08 362/11 |
| 2016/0025993 A1* | 1/2016 | Mor | G02B 27/4205 362/259 |
| 2016/0050401 A1 | 2/2016 | Gordon | |
| 2016/0370594 A1 | 12/2016 | Santori et al. | |
| 2017/0205495 A1 | 7/2017 | Braker et al. | |
| 2019/0273905 A1 | 9/2019 | Wang et al. | |

FOREIGN PATENT DOCUMENTS

| | | |
|---|---|---|
| CN | 104798271 A | 7/2015 |
| CN | 105319811 A | 2/2016 |
| CN | 106569330 A | 4/2017 |
| CN | 106972347 A | 7/2017 |
| CN | 107026392 A | 8/2017 |
| CN | 107039885 A | 8/2017 |
| GN | 106406002 A | 2/2017 |
| WO | 2016/122404 A1 | 8/2016 |

OTHER PUBLICATIONS

First Search dated Nov. 25, 2019, issued in related Chinese Application No. 201710848344.1 (2 pages).
First Office Action dated Dec. 3, 2019, issued in related Chinese Application No. 201710848344.1, with English machine translation (11 pages).
Second Office Action dated Mar. 16, 2020, issued in related Chinese Application No. 201710848344.1, with English machine translation (10 pages).
Supplemental Search dated Jan. 13, 2021, issued in related Chinese Application No. 201710848344.1 (1 page).
PCT International Search Report and the Written Opinion dated Jun. 15, 2018, issued in related International Application No. PCT/CN2018/071989, with partial English translation (11 pages).

* cited by examiner

STRUCTURED LIGHT PROJECTION MODULE FOR PROJECTING UNRELATED PATTERNS

CROSS-REFERENCE TO RELATED APPLICATION

This is a continuation of International Patent Application No. PCT/CN2018/071989, filed on Jan. 9, 2018, and entitled "STRUCTURED LIGHT PROJECTION MODULE FOR PROJECTING UNRELATED PATTERNS", which is based on and claims priority to and benefit of Chinese Patent Application No. 201710848344.1, filed with China National Intellectual Property Administration (CNIPA) of People's Republic of China on Sep. 19, 2017. The entire disclosures of all of the above-identified applications are incorporated herein by reference.

TECHNICAL FIELD

The present application relates to the field of electronic and optical components, and in particular, to a diffractive optical element and a structured light projection module for projecting uncorrelated (unrelated) patterns, and a depth camera having the same.

BACKGROUND

A depth camera can obtain depth information of a target to realize 3D scanning, scene modeling, and gesture interaction. Compared with RGB cameras widely used currently, the depth camera has gradually attracted more and more attention in all fields. For example, a motion sensing game may be realized by combining the depth camera with a television, a computer, and the like, to enjoy the game and fitness at the same time. With rapid popularization of mobile terminal devices, such as mobile phones and tablet computers, there is an urgent need to embed a depth camera into a mobile terminal. The mobile terminal with the depth camera can implement functions such as a face recognition, a gesture interaction, and even AR (augmented reality) more accurately and reliably than a common RGB camera does.

Compared with a conventional depth camera used in televisions and computers, a depth camera embedded in the mobile terminal may require a small size and low power consumption. It is difficult for the depth cameras with an edge laser emitter as a light source to meet the requirements hereinbefore. Therefore, the use of a vertical-cavity surface-emitting laser array will become a trend. However, the use of an array light source may also bring some problems, and the most prominent problem is the difficulty in projecting highly uncorrelated structured light patterns, resulting in low precision of the depth image calculation.

SUMMARY

The present application provides a diffractive optical element, a structured light projection module for projecting unrelated patterns, and a depth camera, to resolve a problem of uncorrelated structured light patterns.

In a first aspect, a diffractive optical element for projecting light patterns is provided. The diffractive optical element is configured to receive a first patterned beam, and diffract the first patterned beam to project a second patterned beam outwardly. The second patterned beam is formed by a combined arrangement of a plurality of first patterned beams. The combined arrangement is periodically arranged in a first direction and a second direction, and the first direction and the second direction are not perpendicular to each other.

In a second aspect, a structured light projection module for projecting light patterns is provided. The structured light projection module may comprise: a light source array, formed by a plurality of sub-light sources arranged in a two-dimensional pattern, and emitting a two-dimensional pattern beam corresponding to the two-dimensional pattern; and a diffractive optical element, configured to receive the two-dimensional pattern beam and diffract a structured light pattern beam outwardly. The structured light pattern beam is formed by a combined arrangement of a plurality of two-dimensional pattern beams. The combined arrangement is periodically arranged in a first direction and a second direction, and the first direction and the second direction are not perpendicular to each other.

In a third aspect, a depth camera is provided. A depth camera may comprise: a projection module, configured to project a structured light pattern beam to a target region; and an acquisition module, disposed at a certain distance from the projection module and forming a baseline with the projection module, and configured to acquire a structured light pattern in the target region. The structured light pattern is formed by a combined arrangement of a plurality of two-dimensional patterns. The combined arrangement is periodically arranged in a first direction and a second direction, and the first direction and the second direction are not perpendicular to each other.

In some embodiments, a first angle $\alpha$ is formed between the first direction and the second direction, wherein $\alpha$ satisfies: $80° \leq \alpha \leq 89°$. In some embodiments, the baseline extends between the projection module and the acquisition module and is perpendicular to a light axis of the projection module and a light axis of the acquisition module, the baseline has a baseline direction, wherein a second angle $\theta$ is formed between the first direction and the baseline direction or between the second direction and the baseline direction.

In some embodiments, the second angle $\theta$ is $1° \leq \theta \leq 10°$, and one of the first direction or the second direction is perpendicular to the baseline direction.

In some embodiments, both of the first direction and the second direction are misaligned with the baseline direction.

In some embodiments, the second angle $\theta$ is configured to satisfy: $L \sin \theta \leq ks$ & $L \tan \theta \leq ks$, wherein L is a length of the target region in the baseline direction, s is a length of the two-dimensional pattern in a direction perpendicular to the baseline direction, and k is a positive integer.

In some embodiments, k satisfies: $2 \leq k \leq 10$.

In some embodiments, a row of the two-dimensional patterns arranged in the first direction has a total misalignment in a direction perpendicular to the baseline direction, wherein the total misalignment does not exceed a height of a two-dimensional pattern in the direction perpendicular to the baseline direction.

In some embodiments, the depth camera may further comprise an RGB camera, and the RGB camera is disposed between the projection module and the acquisition module.

In some embodiments, the projection module, the acquisition module, and the RGB camera are coplanar.

In some embodiments, the projection module comprises a Vertical-Cavity Surface-Emitting Laser (VCSEL) array light source chip, a lens, and a diffractive optical element (DOE).

In some embodiments, the VCSEL array light source chip comprises a plurality of VCSELs irregularly arranged in the two-dimensional patterns.

In some embodiments, the DOE is configured to receive a light beam from the VCSELs and project the structured light pattern beam to the target region.

In some embodiments, the DOE is arranged such that an effective diffraction region of the DOE is deflected with respect to the baseline.

In some embodiments, the VCSEL array light source chip has a side in parallel with the baseline.

In some embodiments, the VCSEL array light source chip and the effective diffraction region of the DOE are synchronously deflected with respect to the baseline.

Beneficial effects of the present application may comprise, by configuring the diffractive optical element, the outwardly projected structured light pattern is periodically arranged in two directions, and the two directions are not perpendicular to each other, so that spot patterns are highly uncorrelated in a plurality of directions, thereby improving precision of the depth image calculation.

DETAILED DESCRIPTION OF EMBODIMENTS

The following further describes the present application in detail with reference to specific embodiments and accompanying drawings. It should be emphasized that the following descriptions are merely exemplary, and are not intended to limit the scope and application of the present application.

For a structured light projection module projecting spot (speckle or structured light) patterns and a depth camera based on the module, the density of the spot patterns may have an effect on precision of a final depth image output from the depth camera. In addition to the density, the uncorrelation of the spot patterns also has an important effect on the precision. The uncorrelation of the spot patterns generally means that a small region randomly selected with a certain pixel area in the patterns (for example, pixels of 7×7 or 11×11), whose feature in the spot arrangement is unique in a plurality of directions or a single direction in the spot pattern region.

Therefore, when designing the structured light projection module, it is necessary to consider how to project highly uncorrelated spot patterns.

The present application provides a structured light projection module and a depth camera used to project highly uncorrelated spot patterns.

Figure 1:
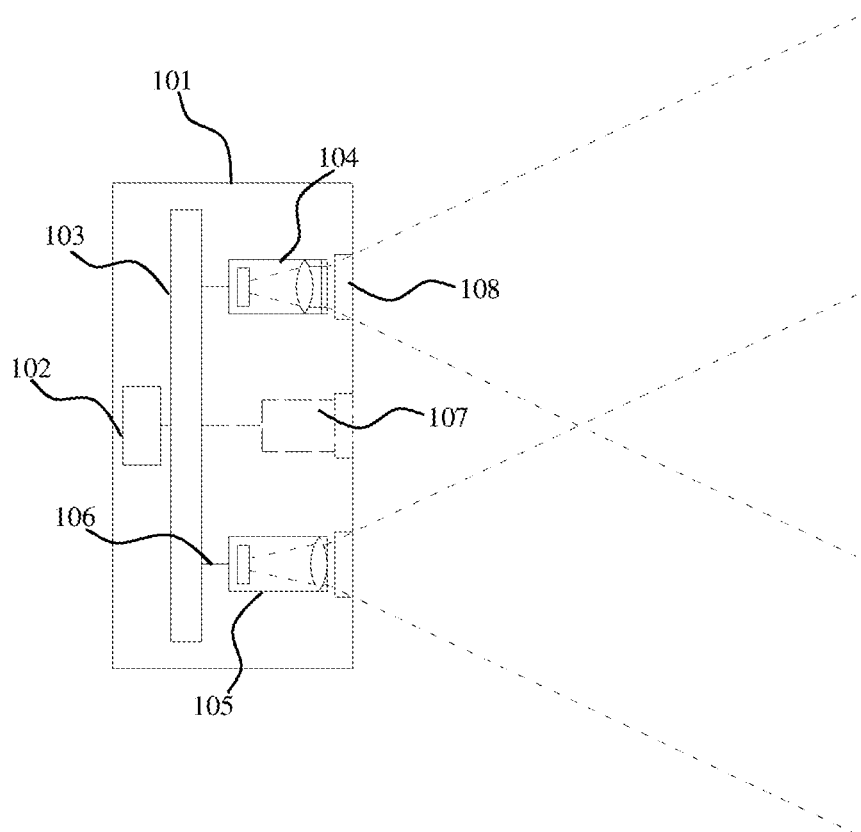
FIG. 1 is a schematic diagram of a depth camera according to an embodiment of the present application.

FIG. 1 is a schematic diagram of a depth camera based on a structured light according to an embodiment of the present application. A depth camera 101 may include a structured light projection module 104, an acquisition module 105, a mainboard 103, and a processor 102. In some embodiments, the depth cameras may be equipped with an RGB camera 107. The structured light projection module 104, the acquisition module 105, and the RGB camera 107 are generally installed on a same plane of the depth camera 101, and are generally located on a same baseline. A distance between the projection module 104 and the acquisition module 105 is a baseline distance, and each module or camera corresponds to a light entrance/exit window 108. Generally, the processor 102 is integrated on the mainboard 103, and the structured light projection module 104 and the acquisition module 105 are connected to the mainboard 103 through an interface 106, wherein the interface 106 may be a DVP interface, an MIPI interface, or the like. The mainboard 103 may be a PCB or other circuit boards, and may also be a semiconductor substrate. The structured light projection module 104 is used to project an encoded structured light pattern to a target space, and the structured light pattern acquired by the acquisition module 105 is processed by the processor 102, so as to obtain a depth image of the target space. In an embodiment of the present application, the structured light pattern may be an infrared speckle pattern (spot pattern). The spots in the spot pattern have a relatively uniform distribution and very high local uncorrelation. The local uncorrelation herein refers to high uniqueness of each sub-region in the pattern along a direction of a certain dimension (for example, a baseline direction). The acquisition module 105 may be an infrared camera, which corresponds to the structured light projection module 104. After receiving a speckle pattern by the acquisition module, the depth image may be obtained by calculating, using the processor 102, a deviation value between the speckle pattern and a reference speckle pattern. The processor 102 is not only used for depth calculations, but also used to control operations of various components, such as turning on each module synchronously at a specific frequency. The depth camera 101 shown in FIG. 1 may be an independent depth camera apparatus including an output interface (not shown in FIG. 1), such as a USB, an MIPI, and other interfaces. The output interface is further connected to the processor 102 or the mainboard 103, so as to output the depth image to other host devices or other modules in a same device.

In some embodiments, the depth camera may be integrated into other devices in a form of an embedded module, such that the processor 102, the mainboard 103, or the like may be components in other devices. The depth camera may be integrated into other devices in various ways, such that the depth camera may be integrated as an independent module or a module shared with other components. In an embodiment, functions of the processor 102 (the mainboard 103, or the like) may be implemented by a processor(a mainboard or the like) of the integrated devices.

Figure 2:
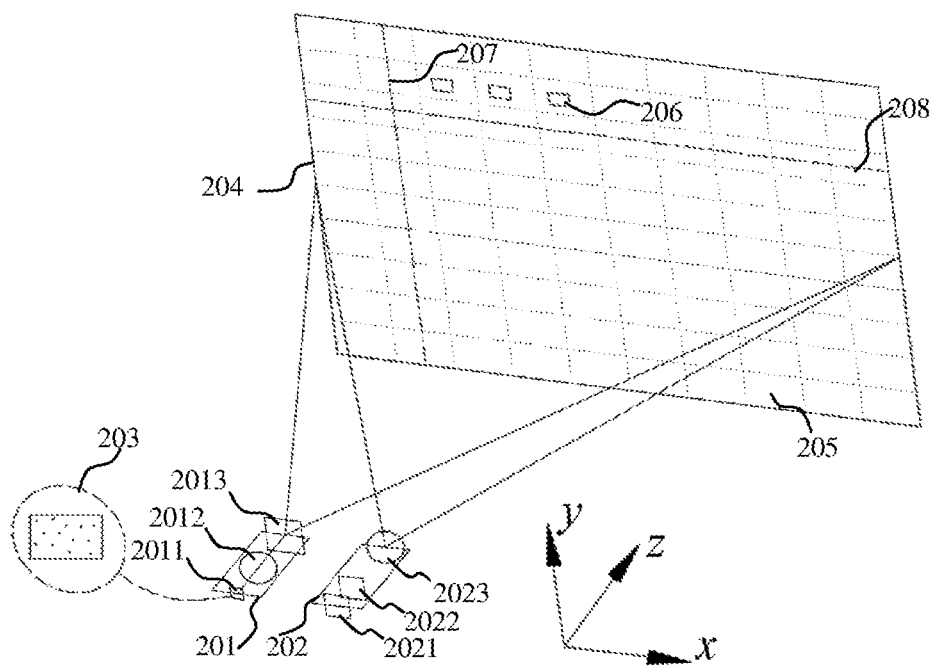
FIG. 2 is a schematic diagram illustrating projection and acquisition principles of a structured light according to an embodiment of the present application.

FIG. 2 is a schematic diagram of a structured light illustrating projection and acquisition principles of a structured light according to an embodiment of the present application. A structured light projection module 201 is used to project spot patterns on a space region 204, and an acquisition module 202 is used to receive the projected spot patterns. The region 204 is a common region of the projection module 201 and the acquisition module 202. The size of the region 204 does not exceed that of an independent FOV (field of view) region of the structured light projection module 201 or the acquisition module 202. Generally, the region 204 is an acquisition region of the acquisition module 202. For illustration, the region 204 is selected on a plane spaced at a certain distance Z from the depth camera.

A line connecting between an optical axis of the structured light projection module 201 and an optical axis of the acquisition module 202 is a baseline. In this embodiment, it is assumed that the baseline is located on an x axis, as shown in FIG. 2.

The structured light projection module 201 includes a Vertical-Cavity Surface-Emitting Laser (VCSEL) array light source chip 2011, a lens 2012, and a diffractive optical element (DOE) 2013. The light source chip 2011 is formed by a plurality of VCSELs arranged in the form of an irregular two-dimensional patterns 203. The irregular arrangement of the plurality of VCSELs is used to improve the uncorrelation of the spot patterns, and in some embodiments, a regular arrangement may also be adopted. The lens 2012 is used to converge or collimate a light emitted from the light source chip 2011 to improve the contrast of the spot patterns. The lens 2012 may be a single lens or a combination lens composed of multiple lenses, or may be formed by a microlens array, wherein each unit of the microlens corresponds to each sub-light source of the VCSEL. The DOE 2013 is used to expand a beam and project it at a certain diffractive angle. In one aspect, the DOE 2013 expands a beam emitted by the light source chip 2011, and in another aspect, it forms a certain projection angle to project the spot patterns with a larger field of view.

Compared with a single light source, the spot patterns formed by the array light source projected by the DOE can be regarded as a combination of a plurality of two-dimensional patterns 205 of the array light source, and a quantity of the two-dimensional patterns 205 combined in the spot patterns may be equal to a quantity of beam expansions performed by a single beam through the DOE. The two-dimensional patterns 205 may be regarded as an image of the two-dimensional patterns 203 arranged by the light source chip, that is, there may be a magnification ratio relationship between the two-dimensional patterns 205 and the two-dimensional patterns 203. In the embodiment shown in FIG. 2, in the projection region 204, the DOE expands the two-dimensional patterns 205 to 100 times and regularly arranges the expanded patterns in the region 204 in two directions perpendicular to each other, wherein the adjacent two-dimensional patterns 205 are two-dimensional patterns adjacent to each other. A spacing between the adjacent two-dimensional patterns 205 is achieved by controlling the beam expanding manner of the DOE, that is, controlling a diffraction angle difference between two beams of two adjacent diffraction orders, so as to control the density, or the uncorrelation of the spot patterns. In other embodiments, the adjacent two-dimensional patterns 205 may also be spaced apart or overlap with each other. Whether the two-dimensional patterns 205 are adjacent, spaced, or overlapped, the spot patterns may have a relatively uniform density distribution and high uncorrelation.

As shown in FIG. 2, the region 204 is formed by 100 two-dimensional patterns 205 arranged along a baseline direction 208 and a direction 207 perpendicular to the baseline to form spot patterns that are periodically arranged in x and y directions. Considering the uncorrelation of the spot patterns, a sub-region 206 in the two-dimensional pattern 205 may be selected randomly, and the same sub-region may be found in other two-dimensional patterns 205 arranged in any direction. It is foreseeable that whether the two-dimensional patterns 205 are overlapped, adjacent, or spaced, a plurality of sub-regions correlated to the sub-region 206 can be found, resulting in a low uncorrelation of the spot patterns.

Figure 3:
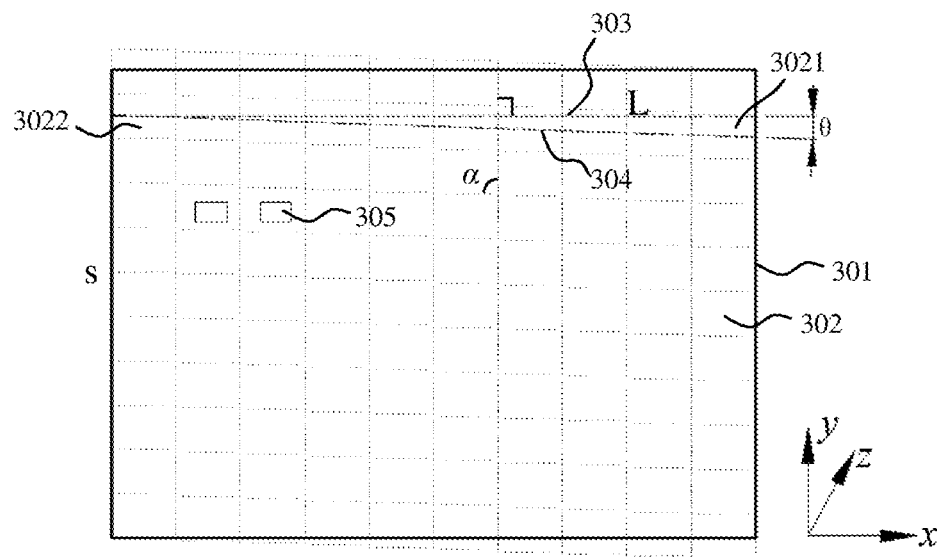
FIG. 3 is a schematic diagram of a structured light pattern according to an embodiment of the present application.

FIG. 3 is a schematic diagram of a structured light pattern according to an embodiment of the present application. Compared with FIG. 2, spot patters are formed by combining and arranging two-dimensional patterns 302 of the light source chip, and the spot patterns are also periodically arranged in two directions. The difference is that there is a misalignment among the two-dimensional patterns 302 in the y direction, so that there is an angle θ between a connecting line 304 at the center of the plurality of two-dimensional patterns 302 arranged along the baseline direction (the x direction) and the baseline 303. In this case, the spot patterns are periodically arranged in the direction of the connecting line 304 and the y direction, and the two directions in periodic arrangement are no longer perpendicular to each other. To generate two-dimensional patterns that are not perpendicular to each other, the DOE needs to be designed (for example, by engraving an optical substrate), so that the DOE can diffract incident beams to form patterns that are periodically arranged in two non-perpendicular directions. With this design, the uncorrelation of the structured light pattern shown in FIG. 3 in multiple directions (especially in the x direction) can be significantly improved, so it will be more suitable for structured light projection.

It can be understood that, the angle α between two directions is to be taken within a proper range. If the angle is too small, the uncorrelation will not be improved obviously. If the angle is too large, the two-dimensional pattern 302 may repeatedly appear at a corresponding position in a certain period, and the non-correlation of the sub-region 305 will be reduced. In an embodiment, the angle formed between the two directions may include an acute angle and a complementary obtuse angle, and the acute angle is within a range of $80°≤α≤89°$.

In the embodiment shown in FIG. 3, since the two directions of the periodic arrangement are not perpendicular, the upper boundary and the lower boundary of the entire spot patterns may both have an angle with the baseline. Considering that an FOV of the acquisition module is generally of square on a plane (the deformation caused by the aberration is not considered in the present application), so the region of the spot patterns may be larger than the acquisition region 301.

In some embodiments, the depth camera may often only need to meet the uncorrelation in a single direction. According to the principle of three-dimensional measurement of the structured light, once the spot patterns meet the uncorrelation requirement in the baseline direction, the depth image can be approximately and accurately calculated. For this reason, in the embodiment shown in FIG. 3, the spot patterns are periodically arranged along a direction having an angle θ with respect to the baseline direction. It is unlikely to find, in other two-dimensional patterns 302, almost the same sub-region comparing to the sub-region 305 which is randomly selected along a direction of the baseline 303. Therefore, the uncorrelation of the spot patterns along the baseline direction is improved. It may be understood that, the angle θ is to be taken within a proper range. If the angle is too small, the uncorrelation will not be improved obviously. If the angle is too large, the two-dimensional pattern 302 along the baseline direction may repeatedly appear at a corresponding position in a certain period, and the uncorrelation of the sub-region 305 will be reduced. In an embodiment, the range of angle θ may be $1°≤θ≤10°$. In another embodiment, a first two-dimensional pattern 3021 at one end of the acquisition region (common region) 301 along the baseline direction is misaligned to a second two-dimensional pattern 3022 at the other end. The misalignment between the first two-dimensional pattern 3021 and the second two-dimensional pattern 3022 in a direction perpendicular to the baseline does not exceed a length of the two-dimensional pattern 302 in the direction perpendicular to the baseline. The formula may be expressed as follows:

$$L \sin \theta \leq s \ \& \ L \tan \theta \leq s \quad (1)$$

where L is a length of the acquisition region 301 in the baseline direction, and s is a length of the two-dimensional pattern 302 in the direction perpendicular to the baseline. Since the value of θ is small, either a sine function or a tangent function may be used.

Since L>>s, θ needs to be very small to satisfy the above condition, resulting in that the misalignment is not obvious and the non-correlation may not be improved. In some embodiments, considering that the spot deviation caused by a depth of an object is not too large, a sub-region is allowed to be repeated at places far from the sub-region in the baseline direction, such as repeating from 2 to 10 times in the baseline direction. In this case, the formula (1) may be shown as follows:

$$L \sin \theta \leq ks \ \& \ L \tan \theta \leq ks \ k \in [2,10] \quad (2)$$

The DOE that generates the spot patterns as shown in FIG. 3 may be required to diffract the incident beams to form patterns that are periodically arranged in two directions, and the two directions are not perpendicular to each other. As shown in FIG. 3, when the incident beam is a two-dimensionally patterned beam of the light source array, the incident beam is diffracted to form spot pattern beams that are periodically arranged in a direction at an angle θ with the baseline direction and in another direction perpendicular to the baseline direction. It can be understood that, if the incident beam is a single beam, the patterns formed by the DOE diffraction are spot patterns formed by arranging a center point of each two-dimensional pattern 302 shown in FIG. 3, and this basis is generally used to guide the design process of DOE design.

Figure 4:
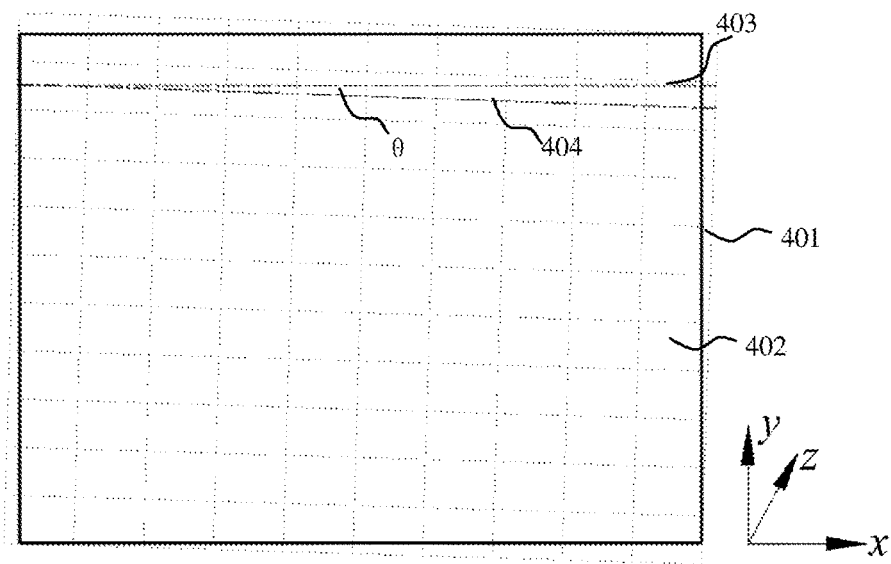
FIG. 4 is a schematic diagram of a structured light pattern according to another embodiment of the present application.

FIG. 4 is a schematic diagram of a structured light pattern according to another embodiment of the present application. Different from the embodiment shown in FIG. 3, two-dimensional patterns 402 along a direction of a baseline 403 are misaligned in a direction not perpendicular to the baseline. Compared with the embodiment shown in FIG. 2, the spots patterns are similar to the spot patterns shown in FIG. 2. The spot patterns in FIG. 2 have a periodic arrangement in the baseline direction, and the spot patterns shown in this embodiment of FIG. 4 also have a certain periodicity in one direction. The difference is that, the spot patterns in this embodiment are deflected entirely (both x axis and y axis) at a deflection angle θ, that is, there is an angle θ between the periodic arrangement direction of the spot patterns and the baseline direction, resulting in improvement of the uncorrelation of the spot patterns in the baseline direction. The deflection angle should also be moderate. According to the above analysis, the deflection angle can also be estimated according to the formulas (1) and (2).

The method for forming the spot patterns shown in the embodiment of FIG. 4 is different from that of FIG. 3. The spot patterns shown in FIG. 3 are formed by designing the performance of the DOE. In the embodiment shown in FIG. 4, no special performance of the DOE itself is required. The DOE still generates the spot patterns shown in FIG. 2, but the DOE is deflected during the manufacture or installation process, as described in detail below.

FIGS. 5A-5D are schematic structural diagrams of a depth camera according to embodiments of the present application. The depth camera in FIG. 5A includes an acquisition module 501. A projection module is formed by a light source chip 504, a DOE 503, and a housing 506. The acquisition module 501 and the projection module are located on a baseline 502. The DOE 503 generally has a structure of periodic diffractive units formed by engraving or other processes on an optical substrate. The region where the structure of periodic diffractive units is located is a diffraction region of the DOE 503, and the region that acts on the light source in actual use is an effective diffraction region 505.

Figure 5:
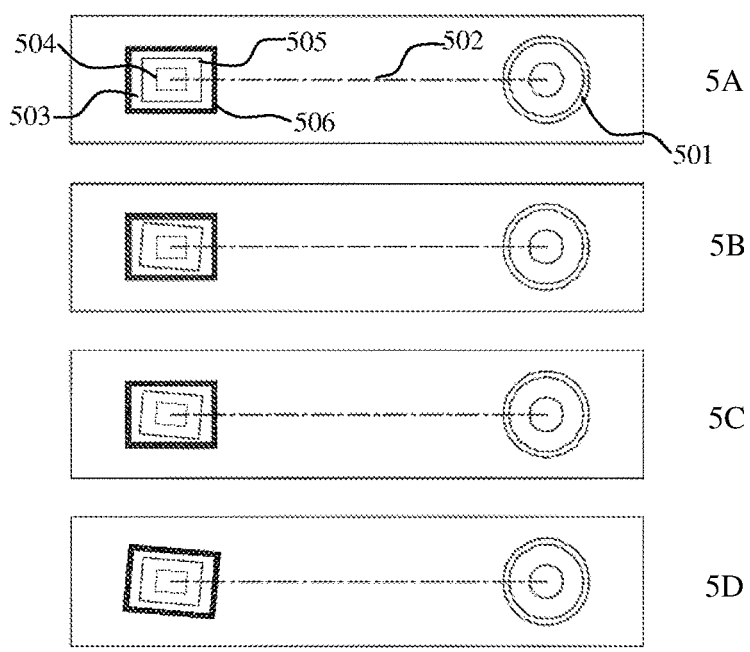
FIGS. 5A-5D are schematic diagrams illustrating structures of various depth cameras according to various embodiments of the present application.

To form a structured light pattern shown in FIG. 4, in an embodiment, the effective diffraction region 505 is deflected by a certain angle θ during the manufacture of the DOE, and the light source chip is not deflected during the installation. As shown in FIG. 5B, a structured light pattern similar to that in FIG. 4 may be generated. The structure of diffractive units in the effective diffraction region 505 can still be designed according to regular undeflected spot patterns shown in FIG. 2 for reducing the design difficulty. The original diffraction unit structure is periodically arranged in two periodic arrangement directions perpendicular to each other (such as the x and y directions). After the effective diffraction region 505 is deflected, the periodic arrangement directions are also changed, such that an angle θ exists between the deflected direction (deflected x direction) and the baseline direction. However, since the chip or the arrangement of the light sources on the chip is not synchronously deflected, the density distribution of the spot patterns is changed by deflecting the effective diffraction region, and the magnitude of the change is related to the deflection angle. The larger deflection angle is, the more uneven density distribution is. Therefore, the deflection angle herein is not supposed to be too large, and is generally within a range of 1 to 10 degrees.

FIG. 5C is a schematic diagram of a depth camera that may generate a structured light pattern shown in FIG. 4 according to another embodiment. Compared with FIG. 5B, the light source chip 504 or the light source arrangement on the chip and the effective diffraction region 505 of the DOE 503 are deflected synchronously to generate spot patterns that are highly uncorrelated along the baseline direction. That is, the DOE 503 may still diffract two-dimensional pattern beams emitted from the light source chip 504, and regularly arrange the two-dimensional pattern beams in two directions perpendicular to each other to form the spot patterns shown in FIG. 2. During the installation, through synchronous deflection, one of the two directions perpendicular to each other may have a certain angle with respect to the baseline direction, so that the spot patterns shown in FIG. 4 may be generated.

FIG. 5D is a schematic diagram of a depth camera that may generate a structured light pattern shown in FIG. 4 according to another embodiment. In FIG. 5B and FIG. 5C, both the light source and the DOE are deflected with respect to the housing 506 of the structured light projection module. However, in this embodiment shown in FIG. 5D, the internal structure of the structured light projection module does not deflect with respect to the housing. Instead, the entire structured light projection module is deflected with respect to the baseline during the installation to achieve the same effect as that in FIG. 5C. The difference lies in the assembly or manufacturing process. In the embodiments shown in FIG. 5B and FIG. 5C, the light source or the DOE is deflected during the manufacturing process. In the embodiments shown in FIG. 5D, the structured light projection module is deflected during the module assembly process.

It should be noted that, in the descriptions of the above embodiments, deviations caused by lens, such as aberrations or distortions, are not taken into consideration. Thus, the above descriptions, such as "periodic arrangement", may also be applicable to the situations that errors may exist.

In the existing technical solutions, the spot patterns projected by the projection module including the light source array chip and the DOE are periodically structured in the baseline direction. The uncorrelation of the spot patterns is often improved by the distortion of the camera lens. However, the distortion of the camera lens often causes reduction of the contrast of the spot patterns. In the embodiments of the present application, highly uncorrelated spot patterns along the baseline direction are obtained by the characteristics and deflection of the DOE. The distortion of the camera lens can be controlled under a very low level, thereby obtaining highly uncorrelated and high contrast spot patterns.

The foregoing content further describes the present application in detail with reference to specific/exemplary embodiments, and the specification should not be construed as a limitation on the specific implementation of the present application. For a person skilled in the art, various replacements and variations can be made to the described embodiments without departing from the principle of the present application, and the replacements and variations of the present application shall fall within the scope of the claims of this application.

What is claimed is:

1. A diffractive optical element for projecting light patterns, wherein the diffractive optical element is configured to:
   receive a first patterned beam; and
   diffract the first patterned beam to project a second patterned beam outwardly to form a spot pattern,
   wherein the spot pattern is formed by a combined arrangement of a plurality of two-dimensional patterns, the plurality of two-dimensional patterns are periodically arranged in a first direction and a second direction, and wherein the first direction and the second direction are not perpendicular to each other, wherein an angle $\alpha$ is formed between the first direction and the second direction, wherein $\alpha$ satisfies: $80° \le \alpha \le 89°$.

2. A structured light projection module for projecting light patterns, comprising:
   a light source array, formed by a plurality of sub-light sources arranged in a two-dimensional pattern, and emitting a two-dimensional pattern beam corresponding to the two-dimensional pattern; and
   a diffractive optical element, configured to receive the two-dimensional pattern beam and diffract a structured light pattern beam outwardly to form a structured light pattern,
   wherein the structured light pattern is formed by a combined arrangement of a plurality of two-dimensional patterns, the plurality of two-dimensional patterns are periodically arranged along a first direction and a second direction, wherein the first direction and the second direction are not perpendicular to each other, wherein an angle $\alpha$ is formed between the first direction and the second direction, wherein $\alpha$ satisfies: $80° \le \alpha \le 89°$.

3. A depth camera, comprising:
   a projection module, configured to project a structured light pattern beam to a target region; and
   an acquisition module, disposed at a certain distance from the projection module and forming a baseline with the projection module, and configured to acquire a structured light pattern in the target region;
   wherein the structured light pattern is formed by a combined arrangement of a plurality of two-dimensional patterns, the plurality of two-dimensional patterns are periodically arranged in a first direction and a second direction, and the first direction and the second direction are not perpendicular to each other, wherein an angle $\alpha$ is formed between the first direction and the second direction, wherein $\alpha$ satisfies: $80° \le \alpha \le 89°$.

4. The depth camera according to claim 3, wherein the baseline extends between the projection module and the acquisition module and is perpendicular to a light axis of the projection module and a light axis of the acquisition module, the baseline has a baseline direction, wherein a second angle $\theta$ is formed between the first direction and the baseline direction or between the second direction and the baseline direction.

5. The depth camera according to claim 4, wherein the second angle $\theta$ is $1° \le \theta \le 10°$, and wherein one of the first direction or the second direction is perpendicular to the baseline direction.

6. The depth camera according to claim 4, wherein both of the first direction and the second direction are misaligned with the baseline direction.

7. The depth camera according to claim 4, wherein the second angle $\theta$ is configured to satisfy:
   $L \sin \theta \le ks$ & $L \tan \theta \le ks$, wherein
   L is a length of the target region in the baseline direction,
   s is a length of one of the two-dimensional patterns in a direction perpendicular to the baseline direction, and
   k is a positive integer.

8. The depth camera according to claim 7, wherein k satisfies: $2 \le k \le 10$.

9. The depth camera according to claim 4, wherein a row of the two-dimensional patterns arranged in the first direction has a total misalignment in a direction perpendicular to the baseline direction, wherein the total misalignment does not exceed a height of one of the two-dimensional patterns in the direction perpendicular to the baseline direction.

10. The depth camera according to claim 4, wherein the projection module comprises a Vertical-Cavity Surface-Emitting Laser (VCSEL) array light source chip, a lens, and a diffractive optical element (DOE).

11. The depth camera according to claim 10, wherein the VCSEL array light source chip comprises a plurality of VCSELs irregularly arranged in the two-dimensional patterns.

12. The depth camera according to claim 11, wherein the DOE is configured to receive a light beam from the VCSELs and project the structured light pattern beam to the target region.

13. The depth camera according to claim 12, wherein the DOE is arranged such that an effective diffraction region of the DOE is deflected with respect to the baseline.

14. The depth camera according to claim 13, wherein the VCSEL array light source chip has a side in parallel with the baseline.

15. The depth camera according to claim 13, wherein the VCSEL array light source chip and the effective diffraction region of the DOE are synchronously deflected with respect to the baseline.

16. The depth camera according to claim 3, further comprising an RGB camera, wherein the RGB camera is disposed between the projection module and the acquisition module.

17. The depth camera according to claim 16, wherein the projection module, the acquisition module, and the RGB camera are coplanar.

* * * * *